Patented Mar. 25, 1930

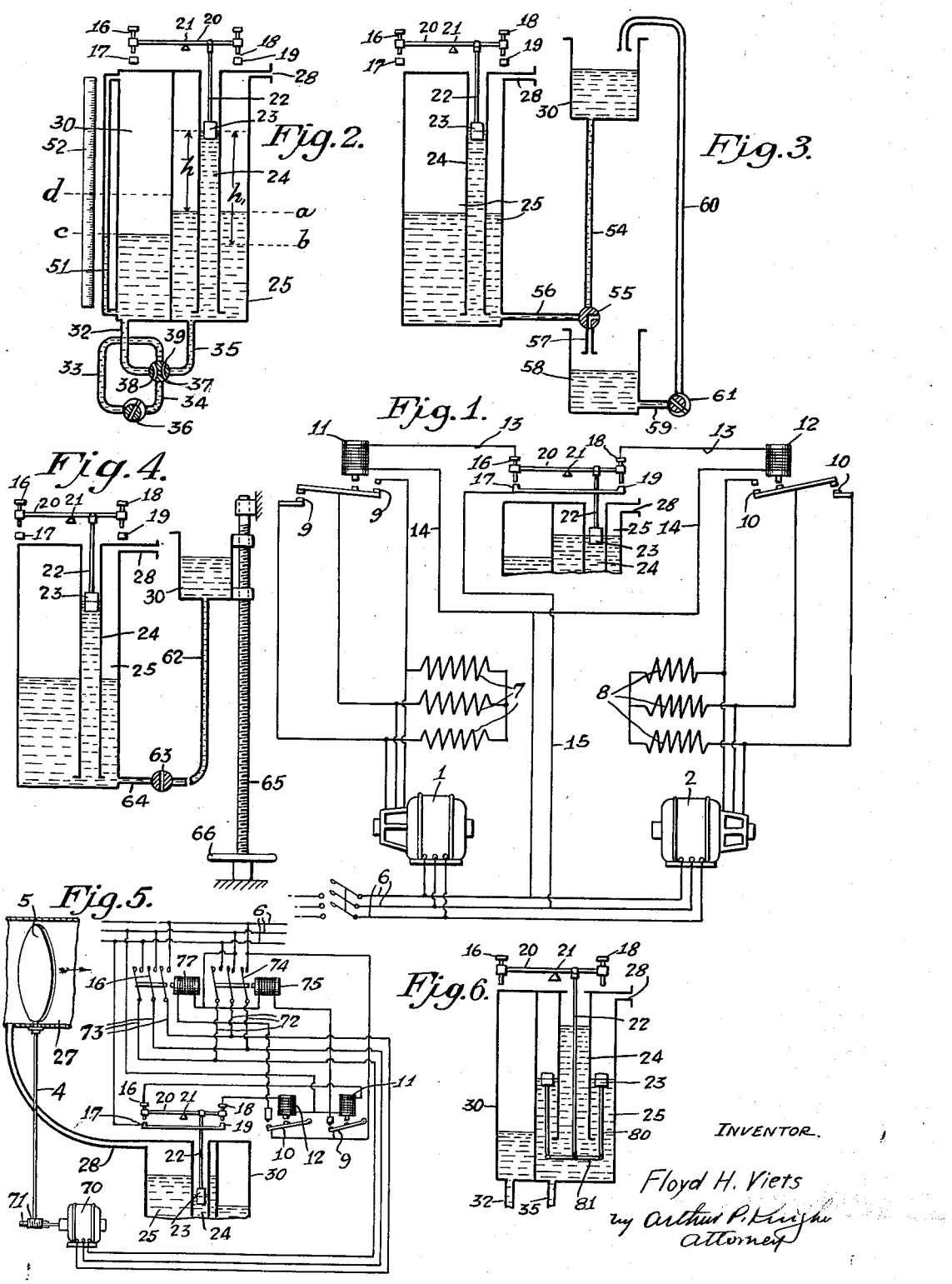

1,752,268

UNITED STATES PATENT OFFICE

FLOYD H. VIETS, OF ALHAMBRA, CALIFORNIA, ASSIGNOR TO INTERNATIONAL PRECIPITATION COMPANY, OF LOS ANGELES, CALIFORNIA, A CORPORATION OF CALIFORNIA

APPARATUS FOR FLUID-PRESSURE REGULATION

Application filed April 15, 1925. Serial No. 23,330.

This invention relates to apparatus for maintaining a desired pressure at any point in the path of a moving fluid and especially for maintaining a desired gas pressure in a flue or passage through which a gas is flowing, or in a chamber in which a gas is being confined. An important object of this invention is to provide an apparatus whereby any desired constant fluid pressure may be maintained, and to also provide simple and novel means for adjusting such constant pressure to any desired value. Another object of the invention is to provide means for adjusting the regulator to maintain any desired pressure without requiring movement of the electrical contact means controlling the operation in case an electrically operated regulator is used, or in general without requiring adjustment of the mechanical parts controlling the operation of the regulator. When used in connection with electrically operated regulators this is of especial advantage, as it eliminates the use of flexible electrical connections which would have to be used if the controlling contact means therefor had to be moved to effect the adjustment. A further object of the invention is to provide for controlling or adjusting the pressure regulation while the regulator is in effective operation and without any necessity of momentarily suspending the regulation to permit such adjustment.

My invention may be used in connection with any fluid pressure regulator which is or may be adapted to be controlled through a float mechanism. Since any type of electrically operated regulator may be readily controlled by suitable electrical contact means adapted to be operated by float mechanism it will be seen that this invention is therefore particularly well adapted for use with any electrically operated regulator. One type of fluid pressure regulator with which my control means is particularly well adapted for use is that described in United States patent to J. H. Reineke, No. 1,480,837, issued January 15, 1924. I will therefore first illustrate and describe my invention in connection with this type of regulator, and will refer to said patent for a description of the detailed operation of such regulator. My invention may also be used with other types of electrically operated regulators, however, as will be described hereinafter. Furthermore, the invention is not limited to use with electrically operated regulators, but may also be used with many types of mechanically operated regulators.

The accompanying drawings illustrate embodiments of my invention and referring thereto:

Fig. 1 is a diagrammatic vertical section of a form of float-controlled electrical contact means and the electric circuits for connection thereof to control an electrically operated regulator, such as described in the above mentioned Reineke patent.

Fig. 2 is a diagrammatic vertical section of the float control means, and adjusting means therefor according to my invention.

Figs. 3 and 4 are diagrammatic vertical sections of the float control means showing modified forms of adjusting means therefor.

Fig. 5 is a diagram showing the electrical connections for controlling the operation of a single motor regulator by means of float-controlled contact mechanism having adjusting means in accordance with my invention.

Fig. 6 is a diagrammatic vertical section of a modified form of float control means, illustrating the application of my invention thereto.

In order that my invention may be more fully understood I will first describe the general principles of the construction and operation of the regulator described in the aforesaid patent to J. H. Reineke. Said regulator comprises two electric motors 1 and 2 (shown in Fig. 1) adapted to operate through suitable differential gear means connected to drive the operating shaft of a damper or other flow controlling or throttling device. The arrangement of said differential gear means is such that when the motors 1 and 2 are running at equal speed, said operating shaft is stationary and the flow controlling device therefore remains unaffected, but upon an increase in speed of one of said motors, the shaft operating the flow controlling device is caused to rotate in one direction, and upon an increase in speed of the other motor said shaft is caused to rotate in the other direction. It may assumed, for example, that the gearing is so arranged that an increase in the speed of motor 1 will cause the operating shaft to rotate in such direction as to close the flow controlling means and an increase in the speed of motor 2 will cause said flow controlling means to move toward open position. Said motors are connected by wiring indicated at 6 to a suitable source of electric current, and any suitable means may be employed for controlling the relative speeds of said motors by the operation of a float mechanism.

For example, as shown in Fig. 1, motors 1 and 2 may be induction motors whose rotor windings are provided with resistances 7 and 8 respectively, said resistances being normally included in said field windings but being adapted to be short circuited therefrom so as to increase the speed of the corresponding motors. The means for accomplishing such short circuiting of the resistance means may comprise contact means 9 and 10 adapted to be controlled by corresponding electromagnets 11 and 12. Said electromagnets are included in electric circuits comprising wires 13, 14, and 15, and including contact means 16, 17, and 18, 19, in the circuits for the respective electromagnets 11 and 12. Suitable pressure-responsive means are provided for controlling connection between contact members 16, 17, and 18, 19, for example the float control means shown in Figs. 1 and 2 may be used for this purpose. The contact members 16 and 18 in this case are mounted on arm 20 pivoted at 21, said arm being pivotally connected to the upper end of rod 22, while contacts 17 and 19 are fixed. Said rod 22 is provided at its lower end with a float 23 adapted to be raised and lowered in response to the raising and lowering of a suitable working liquid such as oil in the float chamber 24. Float chamber 24 opens at its lower end into the lower portion of pressure chamber 25 and is open to the air at its upper end. Pressure chamber 25 is connected, as by pipe 28, to any point, such as a flue, where it is desired to maintain a certain pressure by operation of the flow controlling device controlled by the regulating apparatus. The level of the liquid in chamber 24 is dependent upon the pressure on the surface of the liquid in the pressure chamber 25, said pressure being equal to the fluid pressure at the point of regulation as hereinafter described.

It will be seen that an increase in pressure at the point of regulation and hence in chamber 25 will cause float 23 to be raised, which will in turn move arm 20 in such manner as to close connection between contact members 16 and 17. Electromagnet 11 is thereby energized causing a connection to be closed at contact means 9 controlled by said electromagnet. The resistance 7 in the field winding of motor 1 is thereby short circuited and the speed of said motor consequently increased, causing the flow controlling device to move toward closed position and reduce the pressure to the desired value. On the other hand a decrease in pressure in chamber 25 will cause the float member 23 to be lowered, which will in turn operate in a similar manner to cause the speed of motor 2 to increase and thereby move the flow controlling device toward open position. It will of course be understood that the contact members 9 and 10 could be controlled directly by lever arm 20, but in order to obtain the maximum sensitivity of control it is desirable to have said lever arm operate through the intermediate control circuit 13, 14, 15, and relay means 11 and 12, as shown, said intermediate circuit being adapted to pass less current than the circuits in which contact means 9 and 10 are included, as is customary in such electrical control means.

Referring to Fig. 2 it will be seen that the pressure within pressure chamber 25 when float 23 is in equilibrium position will be equal to the height of the liquid column between the level of the liquid in float chamber 24 and pressure chamber 25 and that such height of the liquid is in turn dependent upon the total amount of liquid in chambers 24 and 25. In order to provide for adjustment of the pressure which is to be maintained, I therefore provide means for increasing or decreasing the total amount of liquid in said chambers so as to adjust the operation of the regulator to maintain any desired pressure. Such adjusting means may comprise for example an auxiliary liquid storage chamber 30, and means including pipes 32, 33, 34, and 35, pump 36 and four-way valve 37 for effecting transfer of liquid between said liquid storage means and said chambers. The four-way valve 37 is provided with ports 38 and 39 and is adapted to determine by the position of such ports with respect to the pipes cooperating therewith the direction in which the liquid will be moved through the system upon operation of pump 36. Said pump may be operated in any suitable manner and is preferably operated only when it is desired to transfer liquid into or out of the chambers 24 and 25.

Storage tank 30 may be provided with a liquid level gage 51 communicating therewith at its upper and lower ends, said gage comprising for example a glass tube so as to indicate the level of the liquid in storage chamber 30 and a suitably graduated scale 52 may be provided adjacent said gage glass for indicating the position of the liquid in said gage glass.

In the operation of this form of the invention, assuming that a certain amount of liquid is present in pressure chamber 25 and float chamber 24, for example as shown in Fig. 2, and that the valve 37 is moved to neutral or closed position as there shown. The regulator will then operate to maintain at the point of regulation a pressure equal to that of the liquid column of height $h$, that is of a height equal to the difference of the level of the liquid in float chamber 24 and in pressure chamber 25 when the float is in equilibrium position. If the pressure at the point of regulation drops below this value the liquid level in float chamber 24 will drop, lowering float 23 so as to close connection between contacts 18 and 19 and cause the flow controlling device to move toward open position as above described until the desired pressure is again restored. The return of the pressure to the desired value again raises float 23 and breaks the connection between contacts 18 and 19 so that the motors 1 and 2 again run at equal speeds and the flow controlling device remains in this new position. If on the other hand the pressure increases above the desired value float 23 will rise and cause the connection to be closed between contact members 16 and 17, and hence cause the regulator to move the flow controlling device toward closed position and again bring the pressure back to normal. The operation of the regulator under these conditions is substantially the same as described in said patent to J. H. Reineke.

If however it is desired to change the pressure at the point of regulation to some other constant value the valve 37 is opened and pump 36 operated so as to move the working liquid into or out of pressure chamber 25. For example, if it is desired to adjust the regulator to maintain a higher pressure, the four-way valve 37 is brought into such position that operation of pump 36 will pump liquid from the chambers 24 and 25 into the storage chamber 30, so as to lower the liquid level in chamber 25 corresponding to equilibrium position of the float, for example from $a$ to $b$. The amount of liquid pumped out of chambers 24 and 25 in this manner is such as to lower the liquid level to the desired point and cause the regulator to operate to maintain an increased pressure in the flue, said pressure being in this case equal to the liquid column of height $h_1$. When the desired amount of liquid has been removed from chambers 24 and 25 valve 37 is closed and pump 36 is stopped, and the regulator will then operate in the same manner as before to maintain a pressure equal to $h_1$. It will be seen that as the equilibrium liquid level falls in pressure chamber 25 there is a corresponding rise in the liquid level in storage chamber 30, for example from the level $c$ to the level $d$, the relation between the drop $a$—$b$ and the rise $c$—$d$ being dependent upon the relative cross-section of pressure chamber 25 and storage chamber 30. It will therefore be observed that the level of the liquid in storage chamber 30 and hence in gage glass 51 gives an indication of the amount of liquid in pressure chamber 25 and hence indirectly an indication of the pressure which is being maintained. By providing a scale as indicated at 52 adjacent gage glass 51 and by properly graduating or calibrating said scale a direct indication may thus be obtained of the pressure maintained by the regulator.

It will be understood of course that upon movement of valve 37 to the reverse position to that above described, pump 36 may be operated to move liquid from storage chamber 30 into the chambers 24 and 25 and raise the equilibrium level of the liquid in chamber so as to provide for maintaining a decreased pressure. By operation of the adjusting means in one direction or the other the float control means for the regulator may therefore be adjusted to cause said regulator to maintain any desired pressure.

While I have shown the adjusting means as located adjacent the float control mechanism, it will be understood that pipe 35 may be of any suitable length and that the adjusting means, comprising storage chamber 30, pump 36 and four-way valve 36, may be located at any desired point, for example at a point remote from pressure chamber 25 and the float means so as to provide for control of the regulator from such remote point. One purpose for which such an arrangement may be advantageously used is for the regulation of the suction in a boiler or kiln in which case it is desirable to locate the adjusting means adjacent the burners.

Other means may be employed for varying the amount of liquid in pressure tank 25 and float chamber 24, for example a simple means for this purpose is shown in Fig. 3. Such means comprises in this case a storage tank 30 connected by pipe 54 to valve 55 and hence through pipe 56 to pressure tank 25. Said valve 55 is adapted to establish communication between pipes 54 and 56, or between pipe 56 and a pipe 57 leading to a suitable collecting chamber 58. In this form of the invention if it is desired to increase the amount of liquid in chamber 25 so as to decrease the pressure to be maintained, valve 55 is turned so as to establish communication between pipes 54 and 56 and permit liquid to flow from storage tank 30 to pressure chamber 25. If on the other hand it is desired to decrease the amount of liquid in pressure chamber 25, valve 55 is turned to establish connection between pipes 56 and 57 so as to permit liquid to flow from chamber 25 to collecting chamber 58. Under normal conditions when the regulator is operating to maintain a constant pressure, valve 55 will of course be turned to neutral position, as shown in Fig. 3. The liquid may be returned from time to time from collection chamber 58 to storage chamber 30 in any suitable manner, for example by hand, as the liquid accumulates in the lower chamber, or pipes 59 and 60 and pump 61 may be provided for this purpose.

Another means of accomplishing the adjustment of the regulator by varying the total amount of liquid in the pressure chamber is shown in Fig. 4. In this form of the invention storage chamber 30 is provided with a flexible connection 62 leading to valve 63 from which pipe 64 leads to pressure chamber 25. Storage chamber 30 is mounted upon a screw or threaded shaft 65 provided with operating means such as hand wheel 66 so that said storage chamber may be moved up or down to any suitable level by operation of said hand wheel. In order to increase the amount of liquid in pressure chamber 25, storage chamber 30 may be raised sufficiently to bring the level of the liquid therein above the level of the liquid in float chamber 24 and valve 63 may then be opened to permit the desired amount of liquid to flow from storage chamber 30 to pressure chamber 25. On the other hand storage chamber 30 may be lowered so that the level of the liquid therein is below the level of the liquid in float chamber 24, whereupon opening of valve 63 will cause liquid to flow in the reverse direction.

Any of the above described means for adjusting the float control mechanism so as to control the operation of the regulator may be applied not only with the type of regulator described in said patent to J. H. Reineke but may also be used in connection with many other electrically operated fluid pressure regulators. For example I have shown in Fig. 5 a regulator comprising a single electric motor 70 connected through gearing indicated at 71 to the shaft 4 of a damper or other flow controlling device 5 in flue 27. In order to show the adaptability of my invention to the adjustment of a regulator for maintaining a suction as well as a positive or superatmospheric pressure, it may be assumed in the case shown in Fig. 5 that a gas is being drawn by an exhausting fan or other suitable means through flue 27 in the direction indicated by the arrow and that a condition of suction therefore exists to the left of damper 5, the amount of the suction being controlled by operation of said damper. The communicating pipe 28 between pressure chamber 30 and flue 27 in this case opens into the flue at a point in advance of the damper, at which point the desired suction is to be maintained. Motor 70 is of the reversible type and is adapted to rotate in one direction or the other upon the establishment of one or the other of two operating circuits 72 and 73. Circuit 72 includes contact means 74 adapted to be closed upon energization of electromagnet 75 due to closing of contact 9 which occurs as before upon raising of float 23. Circuit 73 includes similar contact means 76 adapted to be closed by similar electromagnetic means 77 which are energized upon closing of contact means 10 due to lowering of float 23. Said operating circuits 72 and 73 are connected to the motor in such manner that establishment of circuit 72 causes the motor 70 to rotate in such direction as to move the damper 5 toward open position while establishment of circuit 73 causes said motor to rotate in the reverse direction and move the damper toward closed position.

Any of the adjusting means above described may be used in this case for example that shown in Fig. 2, only the storage chamber 30 thereof being indicated in Fig. 5 however. The total amount of liquid in pressure chamber 25 and float chamber 24 may as before be varied by operation of the adjusting means so as to move the liquid in either direction between storage chamber 30 and float chamber 25. It will be observed that in this case since the regulator is adapted to maintain a suction rather than a positive pressure, the level of the liquid in the float chamber, for equlibrium position of the float, is below the level of the liquid in the pressure chamber, and that the difference between these levels represents the suction which is to be maintained in the flue.

The operation of this type of regulator will be readily understood. For example if the suction in flue 27 increases above the desired point (that is if the absolute pressure in said flue falls below the desired point) float 23 will fall and close connection at contacts 18 and 19, thereby closing contact means 10 and causing the operating circuit 73 to be established which in turn will cause the damper to be operated toward closed position and again reduce the suction in the flue to the desired point. On the other hand if the suction becomes too small the device will operate in a similar but reverse manner to move the damper toward open position and increase the suction. As long as the total amount of liquid in the pressure chamber and float chamber remains unchanged the regulator will therefore operate to maintain substantially constant suction in flue 27. If it is desired at any time to adjust the regulator to maintain a different suction in said flue the adjusting means may be operated as before to increase or decrease the amount of liquid in the float chamber and pressure chamber and thus increase or decrease the suction to be maintained.

My improved controlling or adjusting means is not limited to use with electrically operated regulators, but may also be used advantageously with many types of mechanically operated regulators. For example in certain types of regulators, the movement of the damper or flow-controlling means is effected by piston means adapted to be operated in one direction or the other by means of fluid pressure such as air, steam or water pressure, the admission of such fluid pressure to the piston being controlled by means responsive to changes in pressure at the point of regulation. A regulator of this type operated by the pressure of a working fluid controlled by pressure-responsive means is shown and described in the patent to A. Steinbart, No. 1,306,446, issued June 10, 1919. My invention may be easily adapted to use with such regulators, since the float mechanism thereof comprises such a means responsive to variations in pressure and may be readily adapted to control the admission of fluid pressure to one side or the other of the damper-operating piston means, for example as shown in said patent to A. Steinbart.

It will therefore be seen that in general my invention is applicable in connection with any fluid pressure regulator which may be controlled by float mechanism, and the invention may therefore be considered as comprising in part a novel apparatus for adjusting the float control means of a fluid pressure regulator so as to effect the controlling operation thereof and thereby cause the same to so control the regulator as to maintain any desired pressure.

Modifications may also be made in the type of float control means used in any of the above cases. For example as shown in Fig. 6, float 23 may be ring-shaped and may be located with the pressure chamber 25 instead of in the central chamber 24 which is exposed to atmospheric pressure. In this case the float may be connected to rod 22 by means of vertical rods 80 and horizontal rods 81. The operation of this type of float control means is substantially the same as with that first described, suitable adjusting means being provided as before, for varying the amount of liquid in the two chambers 24 and 25. In this case, however, the effect of varying the amount of liquid therein is opposite to that obtained in the first case, for example, when the regulator is used to maintain positive or super-atmospheric pressure, an increase in the amount of liquid in said chamber will so effect the operation of the control means as to cause the regulator to maintain a higher instead of a lower pressure at the point of regulation.

In either case, however, the float control means comprises two communicating chambers containing a body of liquid, one of said chambers being in communication with a source of fixed pressure such as the atmosphere, and the other being in communication with a variable pressure, that is with the pressure to be regulated, so that the difference between the levels of the body of liquid in said two chambers represents the difference between said two pressures, and a float in one of said chambers and movable in response to variations in the level of the liquid therein and adapted to control the operation of the regulator.

It will of course be understood that any of the types of regulators above described may be adapted to maintain either positive or super-atmospheric pressure, or a negative or sub-atmospheric pressure, and that my improved adjusting means are applicable to the control of any of said regulators for either of these purposes.

Furthermore while I have shown my invention as applied only in connection with regulation of gas pressure it will be readily understood that it may be applied equally well to the regulation of the pressure in any moving fluid, whether a gas or a liquid, the regulator in any case being adapted to operate a flow controlling device such as a damper or valve located in the path of the fluid stream, and said regulator being responsive to variations in the pressure in such fluid stream in such manner as to cause said flow-controlling device to operate to maintain the desired pressure according to the adjustment of the regulator.

I claim:

1. In apparatus for controlling the operation of fluid pressure regulators, a float, means for confining liquid in such position as to operate said float, means for subjecting the liquid so confined to the influence of the pressure to be regulated so as to cause variations in said pressure to vary the level of said liquid and move said float, liquid storage means, means for transferring liquid in either direction between said liquid storage means and said liquid confining means so as to vary the total amount of liquid in said liquid confining means, and means for cutting off communication between said liquid storage means and said liquid confining means.

2. In apparatus for controlling the operation of fluid pressure regulators, a float, means confining a body of liquid in position to operate said float, means for subjecting the liquid so confined to the influence of the pressure to be regulated so as to cause variations in said pressure to vary the level of said liquid, liquid storage means, means for effecting transfer of liquid in either direction between said liquid confining means and said liquid storage means, means for cutting off communication between said liquid confining means and said liquid storage means, and scale means for indicating the amount of liquid in said liquid storage means.

3. A pressure operated float control device comprising a chamber in communication with a source of variable pressure, a second chamber in communication with a source of fixed pressure, said two chambers being also in communication with one another at their lower portions to permit passage of liquid from one to the other, a body of liquid in said chambers and subjected to the pressures therein, means preventing communication between said chambers above the surface of said body of liquid, a float in one of said chambers and operable by the liquid therein and adapted to be connected to control means, liquid storage means, and means independent of said fixed and variable pressures for effecting transfer of liquid in either direction between said liquid storage means and said two chambers so as to vary the total amount of liquid in said chambers.

4. In apparatus for controlling the operation of fluid pressure regulators, a float device comprising a chamber in communication with a source of variable pressure, a second chamber in communication with a source of fixed pressure, said two chambers being also in communication with one another at their lower portions to permit passage of liquid from one to the other, a body of liquid in said chambers and subjected to the pressures therein, means preventing communication between said chambers above the surface of such body of liquid, a float in one of said chambers and operable by the liquid therein, liquid storage means, liquid passage means connecting said storage means with the lower portion of said chambers, means for transferring liquid in either direction through said liquid passage means and valve means for closing or opening said liquid passage means.

5. A pressure operated float device for control purposes comprising means defining two separate chambers communicating with one another at their lower portions to permit passage of liquid therebetween, a body of liquid in the lower portions of said chambers, means preventing communication between said chambers above the surface of said body of liquid, means for admitting different pressures to said chambers, a float in one of said chambers and operable by the liquid therein, liquid storage means, liquid passage means connecting said liquid storage means to the lower portion of said chambers, means for transferring liquid in either direction through said liquid passage means, and valve means for closing or opening said liquid passage means.

In testimony whereof I have hereunto subscribed my name this 7 day of April, 1925.

FLOYD H. VIETS.